United States Patent [19]

Bowden et al.

[11] Patent Number: 4,633,772
[45] Date of Patent: Jan. 6, 1987

[54] GRIDDLE MOUNTED HOT DOG TURNER WITH LIFT OFF DETACHABLE DRIVE UNIT

[75] Inventors: John E. Bowden, Ostrander; Roy E. Hook, Orient; E. Craig Miller, Powell, all of Ohio

[73] Assignee: Wendy's International, Inc., Dublin, Ohio

[21] Appl. No.: 790,886

[22] Filed: Oct. 24, 1985

[51] Int. Cl.$^4$ .............................................. A47J 37/04
[52] U.S. Cl. ......................................... 99/332; 99/344; 99/423; 99/425; 99/441; 403/407.1
[58] Field of Search .................. 99/423, 425, 332, 344, 99/441; 426/523; 403/253, 254, 349, 375, 407.1

[56] References Cited

U.S. PATENT DOCUMENTS

| | | |
|---|---|---|
| 2,584,061 | 1/1952 | Stilphen .......................... 99/441 X |
| 2,631,525 | 3/1953 | Finizie ................................... 99/423 |
| 3,298,303 | 1/1967 | Waller ................................... 99/423 |
| 3,732,468 | 5/1973 | Witt . |

*Primary Examiner*—Billy J. Wilhite
*Attorney, Agent, or Firm*—Frank H. Foster

[57] ABSTRACT

An apparatus for automatically turning hot dogs upon a conventional griddle which has an easily attachable and detachable motor drive unit and continuously turns the hot dogs and cooks them properly on the griddle. The turner has a grid which slidably rests upon the griddle and has a plurality of laterally elongated openings for receipt of the hot dogs. A portable, detachable drive unit rests upon a surface which is adjacent to the griddle. A releasable coupling means drivingly, but detachable connects the drive unit to the grid for driving the grid in longitudinal reciprocation so that the hot dogs are rotated in alternate directions for even cooking.

9 Claims, 9 Drawing Figures

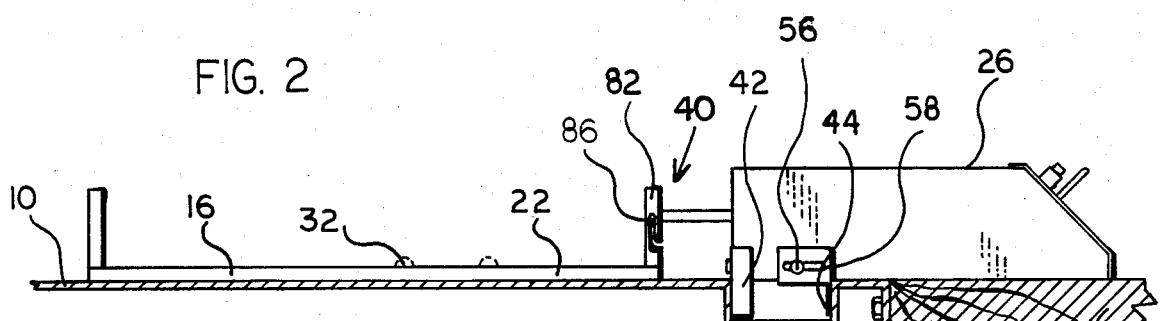
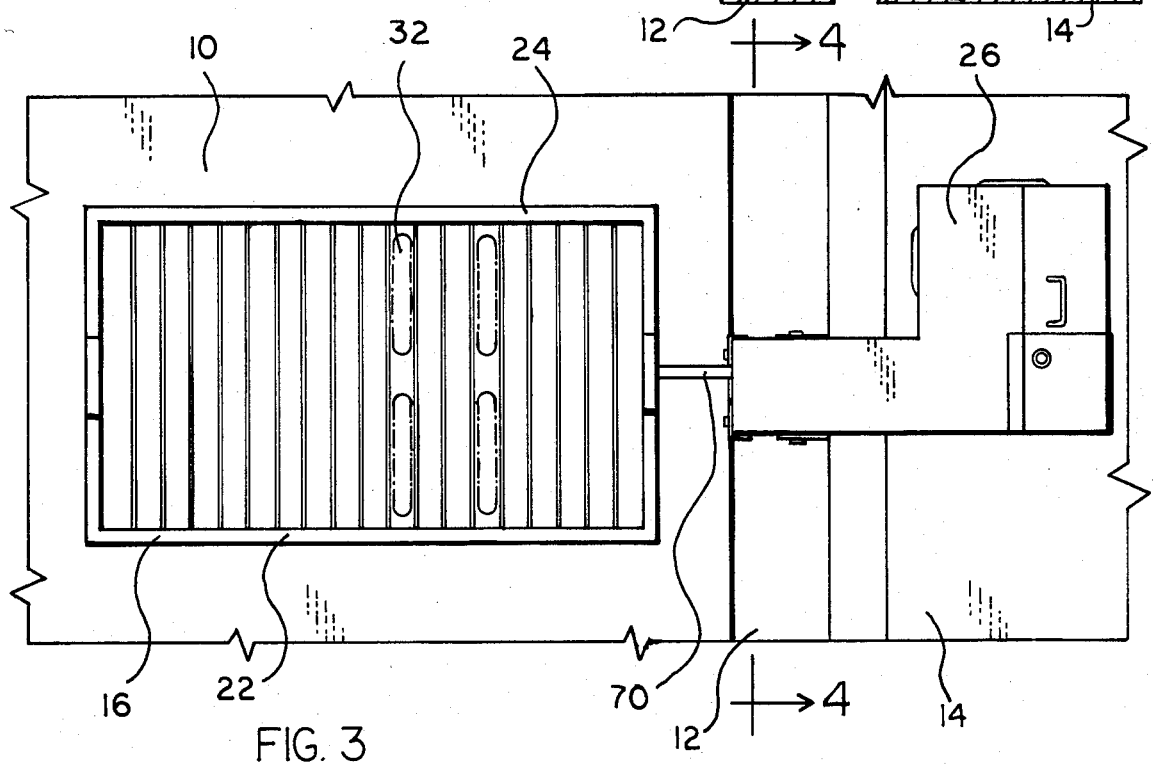
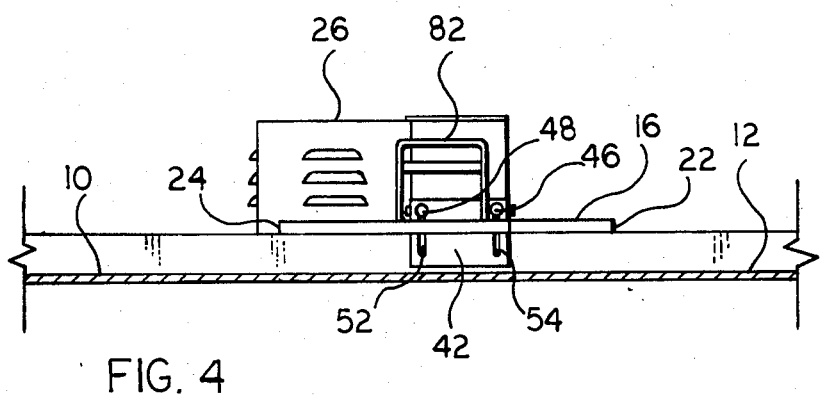

GRIDDLE MOUNTED HOT DOG TURNER WITH LIFT OFF DETACHABLE DRIVE UNIT

TECHNICAL FIELD

This invention relates generally to commercial, food cooking equipment and more particularly relates to a structure which retrofits upon existing, conventional, commercial griddles for the purpose of turning hot dogs or other tubular food products as they are cooking upon the griddle and yet which also has an easily removable drive unit.

BACKGROUND ART

For decades, if not centuries, hot dogs or other sausage type foodstuffs have been manually cooked upon grills or griddles or in frying pans. They are typically turned periodically by the cook so that they will be cooked evenly about their periphery and in their interior. In commercial restaurant operations it is desirable to minimize the manual cooking efforts in order to improve efficiency and reduce food service costs and yet it is also desirable to maintain or improve upon the quality of manually cooked food.

For this purpose there are a variety of single purpose or dedicated, hot dog cooking grills which perform well. One popular type of hot dog cooker and turner has a plurality of closely spaced, heated, metallic tubes which continuously rotate. Alternate tubes rotate in opposite directions of that the hot dogs continuously rotate in contact with the hot tubes.

Although such units operate effectively, they occupy valuable work space even when not in operation. Additionally they include self contained heating units which are a duplicative consumer of energy in a restaurant which already has a conventional griddle, such as is commonly used for grilling hamburgers and eggs. The addition of hot dog cooking equipment to an existing, efficiently planned restaurant operation is a particularly difficult problem because in such an operation each counter position and essentially all the space has been allocated for a particular use. None of this should be sacrificed to the addition of a dedicated hot dog cooker.

There is, therefore, a need for a hot dog turner which can permit the hot dogs to be cooked upon an existing griddle without necessitating manual turning. There is also a need for such a hot dog turner which will permit the cooked hot dogs to be kept warm upon the grill and yet will allow its motor drive unit to be easily detached with a simple motion and without requiring the hot portion of the turner to be touched with human hands. In this way the drive unit can be removed from the space it occupies during a time period of reduced sales so that the space it occupies can be utilized for the preparation of other food. It is also desirable that it can be very quickly and easily reinstalled upon the conventional grill without the need for any significant manual operations requiring any skilled manual dexterity.

There is, furthermore, a need for such a hot dog turner which has a separable food contacting portion which can be completely removed and washed in conventional dishwashing equipment for subsequent reuse.

BRIEF DISCLOSURE OF INVENTION

The present invention includes a grid which slidably rests upon the griddle surface. The grid has a longitudinal axis and a plurality of laterally elongated openings for receipt of the hot dogs or other elongated foodstuff. A portable, detachable drive unit rests upon a surface which is adjacent to the griddle for driving the grid in reciprocation along its longitudinal axis. Preferably, the drive unit has a mating bottom surface which fits in registration with a surface irregularity, such as a grease drain trough, which is adjacent to the griddle. The drive unit is connected to the grid with a releasable coupling means which drivingly but detachably connects the drive unit to the grid to provide a quick lift-off disconnect. The coupling should also restrain the grid from pivotal movement about a vertical axis extending through the coupling so that the grid will not become misaligned obliquely to its path of reciprocation.

BRIEF DESCRIPTION OF DRAWINGS

FIG. 2 is a view in vertical section taken substantially along the line 2—2 of FIG. 1.

FIG. 3 is a top plan view of the embodiment of FIG. 1.

FIG. 4 is a view in vertical section taken substantially along the line 4—4 of FIG. 3.

Figure 5:
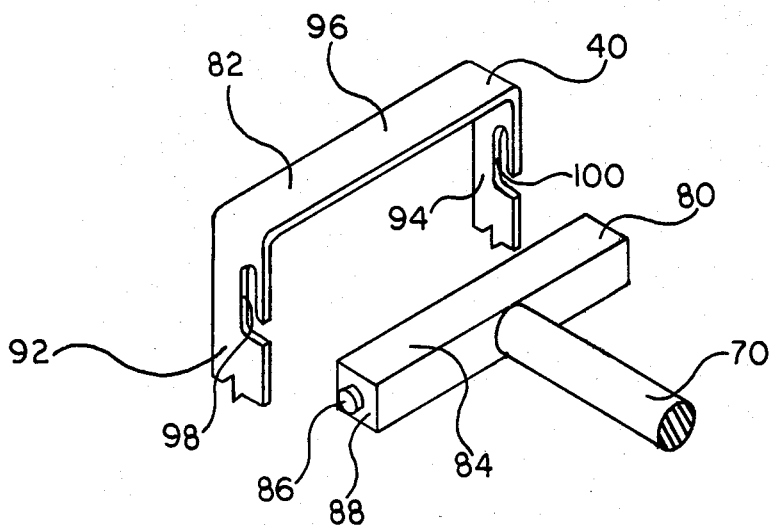
FIG. 5 is a view in perspective of the preferred quick, lift-off disconnect coupling utilized in the embodiment illustrated in FIG. 1.
Figure 1:
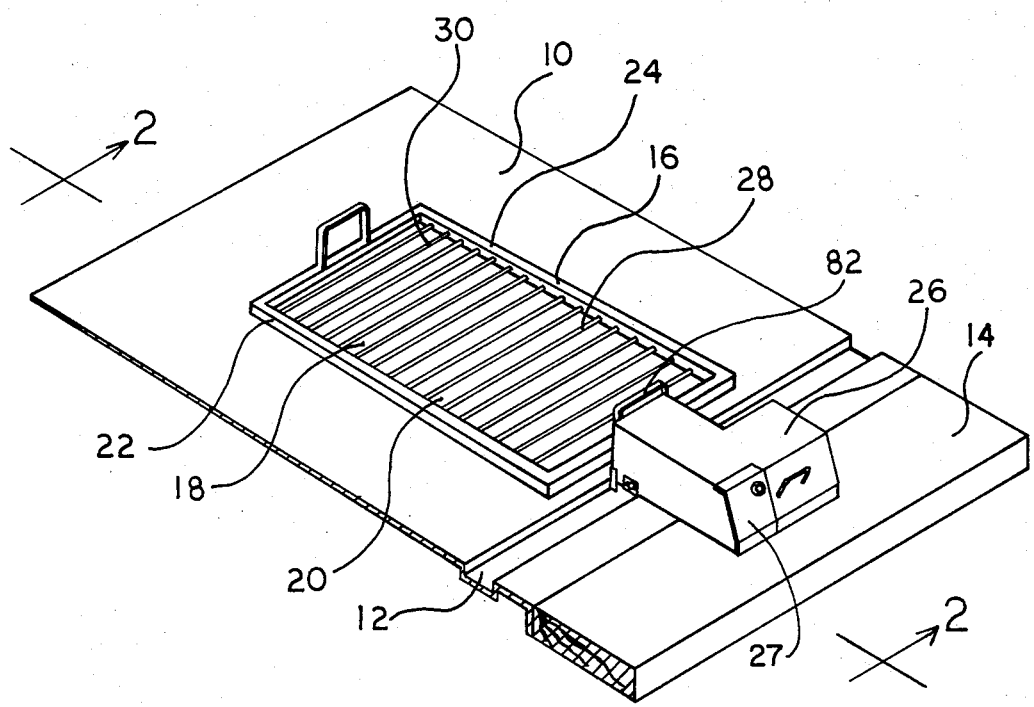
FIG. 1 is a view in perspective of a segment of a griddle upon which the preferred embodiment of the invention is mounted.
Figure 6:
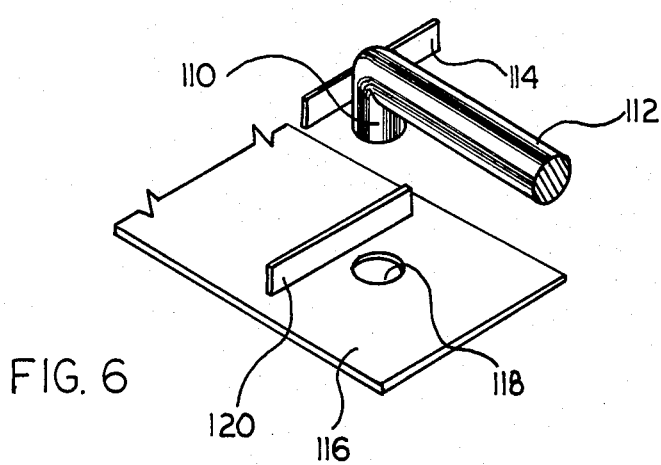
FIG. 6 is a view in perspective of an alternative quick, lift-off disconnect.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIGS. 1-4 illustrate a conventional griddle 10, beneath which is positioned conventional gas, electric or other heaters (not shown) for heating its surface to a suitable temperature for grilling foodstuffs. The griddle 10 is provided with a conventional grease trough 12 to receive any grease, water or burned food particles and aid in maintaining the cleanliness of the griddle 10.

On the opposite side of the grease trough 12 from the horizontal, flat heating surface of the griddle 10, is an adjacent surface 14 which is unheated and is convenient for manipulations of food products, such as the building of a sandwich. This surface 14, sometimes referred to as a sandwich board or apron, protrudes from the front of the griddle and is conveniently constructed of a wooden board mounted to the frame of the griddle 10.

A grid unit 16 slidably rests upon the griddle 10. It has a longitudinal axis which is perpendicular to the orientation of the grease trough 12 and has a plurality of laterally elongated openings, such as openings 18 and 20 for receipt of the foodstuffs.

In particular, the grid 16 is constructed of a pair of laterally spaced, longitudinally oriented frame members 22 and 24 which operate like slides or runners which slide back and forth on the griddle 10 as the grid 16 is reciprocated by a portable, detachable drive unit 26. A plurality of longitudinally spaced rods, such as rods 28 and 30, extend laterally across the grid and in attachment to the frame members 22 and 24. These define the laterally elongated openings which receive the hot dogs or other foodstuffs, such as the hot dog 32 shown in phantom in FIGS. 2 and 3. Preferably the rods are upwardly offset from the bottom surface of the frame members 22 and 24 so that they ride free and clear above the top surface of the griddle 10.

This offset is important for the proper rolling of the hot dog and preferably should not exceed ½ of the product's diameter.

The drive unit 26 rests upon the sandwich board 14 and is drivingly, but detachably connected to the grid 16 by means of a releasable coupling 40 and drives the grid in longitudinal reciprocation along its longitudinal axis.

The interior workings of the drive unit 26 are not illustrated because constrution is well known to those familiar with conventional principles of motor powered drives. Any drive unit may be used, preferably one with an electric motor and conventional mechanisms so that a drive shaft 70, which protrudes from the drive unit 26, operates in a reciprocating motion along its axis. Desirably, the drive unit 26 is also provided with a conventional timer and an alarm 27. In this manner the time for the cooking process may be simultaneously measured and an alarm signalled to the operator that the hot dogs have been cooked for the appropriate time interval.

An important aspect of the present invention is that the drive unit 26 may be conveniently removed and later repositioned without the necessiry of complicated manual operation for attaching or connecting the drive unit to either the grid 16 or the supporting sandwich board 14 and also without requiring that the grid 16 be handled or touched.

The drive unit 26 is restrained against motion along the longitudinal axis of reciprocation by a pair of adjustable legs 42 and 44 which protrude downwardly into the grease trough 12. The leg 42 is vertically adjustable by loosening the bolts 46 and 48 which extend through slots 52 and 54 in the leg 42 and then tightening those bolts when the leg 42 is in the appropriate vertical position so that the weight of the motor drive unit will be resting upon the sandwich board 14 and the leg 42 will be extending downwardly into the grease trough 12.

In addition, the leg 44 is longitudinally adjustable by means of a pair of opposite bolts, such as the bolt 56, which extends through a slot 58 and may be similarly loosened until the leg 44 is at its appropriate longitudinal position and then tightened. The leg 44 is adjusted so that the distance between the distal surfaces of the legs 42 and 44 equals the width of the grease trough 12. Effectively, these legs 42 and 44 form an adjustable downwardly protruding boss which can be adjusted to span the interior width of the grease trough.

The drive unit 26 is held in position against longitudinal movement by its protrusions into the grease trough 12. Since there is no significant side forces exerted upon the structure, its friction with its supporting surface restrains it against lateral movement.

Griddles not having a forward grease trough ordinarily have some other surface regularity such as a slot, holes, or a gap between the sandwich board 14 and the griddle. Alternatively, of course, the surface irregularity could be an upwardly extending ridge or short border or wall extending along the edge of the griddle. In any event, it is only necessary that the bottom portion of the drive unit 26 be constructed or shaped so that it is inversely conforming with the surface contour irregularity so that the structure of the drive unit 26 can matingly engage in registration with the support adjacent the griddle in order to removably retain the drive unit against longitudinal and pivotal movement upon that surface.

Of course, a substantial variety of quick disconnect, releasable couplings can be provided for drivingly connecting the drive unit 26 to the grid 16. However, it is very desirable that the coupling be capable of being disconnected and reconnected without requiring the human operator to grasp the hot grid. Rather, it is desirale that the operator be able to simply grasp the drive unit 26, manipulate it slightly, while holding only it, and remove it from its driving connection to the grid 16. In that manner the grid 16 may be left upon the griddle to maintain the warmth of some hot dogs or to stand by for later use. At the same time the drive unit can be removed so that the sandwich board or apron 14 is accessible for other use.

It is also important that the coupling have the further characteristic of that it restrains the grid against any lateral or pivoting motion about a vertical axis. This is desirable so that the grid 16 will remain aligned along the longitudinal axis of reciprocation. This assures that all the hot dogs will be uniformly rotated during operation of the embodiment of the invention.

The preferred coupling means has a male member 80 which is connected to the drive shaft 70 and a female member 82 which is mounted to the grid 16. The male member has a lateral cross bar 84 which has oppositely directed fingers 86 and another one of the opposite end which is not visible. These fingers extend from shoulders, such as shoulder 88, at the end of the cross bar 84.

The female member 82 has a pair of upwardly extending struts 92 and 94, which are fixed at their bottom ends to the grid 16 and are joined at their top by a cross member 96. The struts 92 and 94 are each provided with a slot 98 and 100 respectively which receive a different one of the fingers. For example, finger 86 may be slidingly received within the slot 98. Each slot opens toward the drive unit and extends upwardly from its opening. In the operable position of the grid 16 and the drive unit 26 upon the griddle, the openings of the slots are positioned below the level of the fingers. The struts 92 and 94 are spaced apart a distance which is substantially equal to the distance between the shoulders, such as the shoulder 84, formed at the opposite ends of the cross bar 84.

The drive unit 26 may be drivingly connected to the grid 16 by simply tilting the drive unit 26 to angle the drive shaft 70 downwardly and then moving the entire unit toward the female member 82 so that the fingers, such as finger 86, slide into the slots 98 and 100. The motor unit is then set down upon the sandwich board 14 causing the fingers 86 to rise up within the slots. The reciprocating motion of the drive shaft 70 is then transmitted to the grid 16. The procedure may be easily and conveniently reversed for removing the drive unit 26.

FIGS. 6–10 illustrate other alternative embodiments of the coupling means of the invention which provide the necessary characteristics. For example, in the embodiment of FIG. 6 the male member may comprise a downwardly bent segment 110 of the drive shaft 112 upon which a laterally extending panel 114 is welded. The female member may comprise a tongue 116 which is welded to the grid and is provided with a hole 118 for receipt of the downward bend 110. A secondary panel 120 is attached to the tongue 116 and positioned so that it will not interfere with the insertion of the downward bend 110 into the hole 118 and yet is sufficiently close to the lateral panel 114 that it will restrain the grid 16 from any pivoting movement about the central, vertical axis of the downward bend 110.

Figure 7:
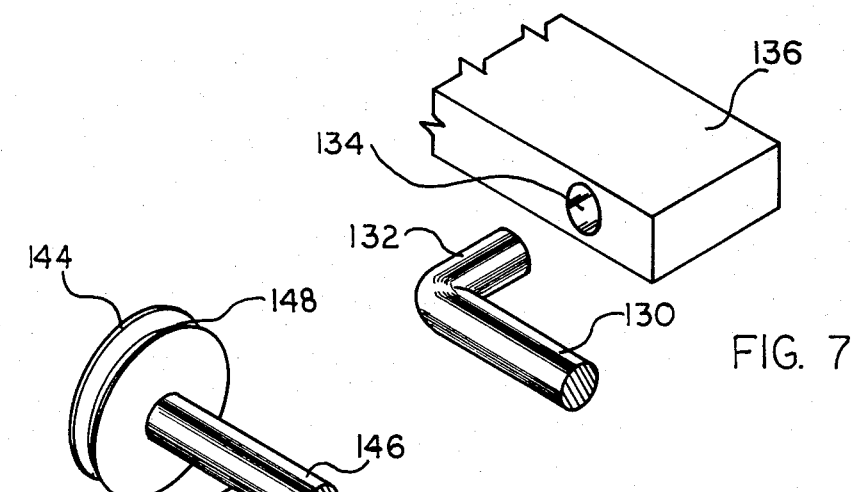
FIG. 7 is a view in perspective of another alternative quick lift-off disconnect.

Another alternative embodiment is illustrated in FIG. 7. The drive shaft 130 is formed with a lateral bend 132 which may extend into a mating, lateral hole 134 formed in another tongue 136, which is in turn welded to the grid 16. In this manner a simple lateral movement of the lateral bend 132 into the hole 134 drivingly secures the drive unit 126 to the grid 16 and yet prevents the pivoting or misalignment of the grid 16.

Figure 8:
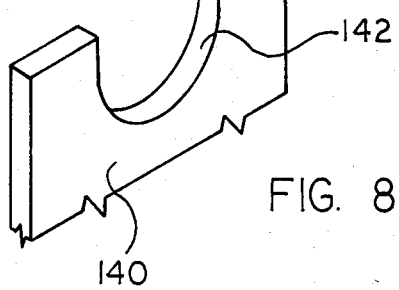
FIG. 8 is a view in perspective of another alternative quick, lift-off disconnect.

As yet another alternative coupling means, illustrated in FIG. 8, an upstanding yoke 140 is welded to extend upwardly from the grid 16. It provides a male member, which is an upstanding panel having an upwardly opening notch 142. A female member 144 is attached to the drive shaft 146 and comprises a body having a generally vertically, oriented, annular slot 148 for receipt of the notched portion of the upstanding panel 140.

Finally, as yet another alternative embodiment, a tongue 150 is welded to the grid and extends toward the drive unit. It is provided with a vertical hole 152 and a horizontal slot 154 which connects to the vertical hole 152. A drive shaft 156 is formed with a downward bent portion 158. The downwardly bent portion 158 seats into the hole 152 while the longitudinal segment of the drive shaft 156 is matingly received within the slot 154.

Figure 9:
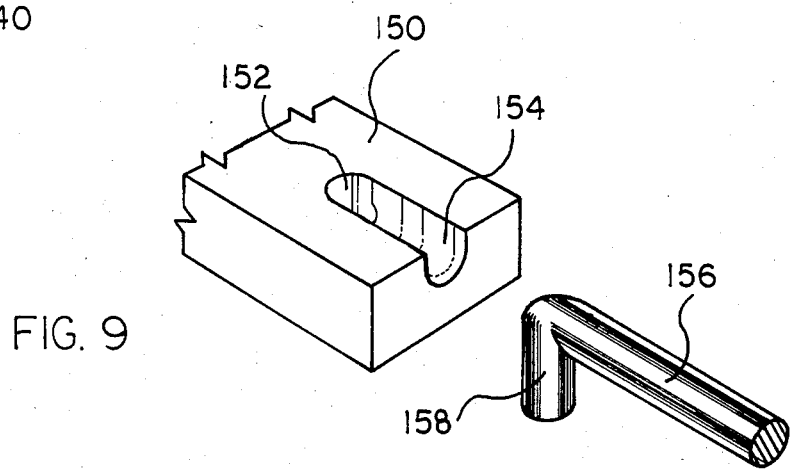
FIG. 9 is a view in perspective of another alternative quick, lift-off disconnect.

The embodiments of the FIGS. 8 and 9 permit the drive unit 26 to be removed by a simple upward movement and to be replaced by a simple downward movement.

In the operation of the preferred embodiment of the invention, the clean grid 16 is positioned upon the hot griddle and the drive unit 26 is attached. The hot dogs are then positioned between the laterally oriented, spaced rods in the quantity which is desired. The drive unit 26 is then energized and begins reciprocating the grid 16 along its longitudinal axis. The stroke of the drive unit 26 is advantageously designed to substantially equal the circumference of conventional hot dogs so that all sides of each hot dog are evenly cooked.

The operator operates the motor drive unit and the timer operation is initiated. When the alarm is actuated the operator may remove the hot dogs and insert new ones or alternatively may remove the motor drive unit so that the surface of the sandwich board 14 is available.

While certain preferred embodiments of the present invention have been disclosed in detail, it is to be understood that various modifications may be adopted without departing from the spirit of the invention or scope of the following claims.

What is claimed is:

1. An apparatus for automatically turning elongated foodstuffs while cooking them upon a griddle which has a generally horizontal, flat heating surface and an adjacent surface beside the heating surface, the apparatus comprising:
   (a) a grid slidably resting upon the griddle, the grid having a longitudinal axis and a plurality of laterally elongated openings for receipt of the foodstuffs;
   (b) a portable, detachable drive unit setting upon said adjacent surface for driving the grid in longitudinal reciprocation, said adjacent surface having laterally extending surface contour irregularities and the bottom surface of the drive unit having a surface contour which is inversely conforming with a portion of the surface contour of said adjacent surface for matingly engaging in registration with the adjacent surface to removably retain the drive unit against longitudinal and pivotal movement upon the surface; and
   (c) a releasable coupling means drivingly but detachably connecting the drive unit to the grid for permitting the drive unit to be lifted and removed from said adjacent surface and said grid without touching, but leaving, said grid on the griddle.

2. An apparatus in accordance with claim 1 where the coupling means includes male and female members which, when coupled together, are restrained against relative longitudinal movement and against relative pivotal movement in a generally horizontal plane but which are separable and unrestrained in a direction transverse of the longitudinal axis.

3. An apparatus in accordance with claim 2 wherein said male member comprises an upstanding panel having an upwardly opening notch at its top and said female member comprises a body having a generally vertically oriented annular slot for receipt of the notched portion of the upstanding panel.

4. An apparatus in accordance with claim 2 or 3 wherein said adjacent surface includes a downwardly and laterally extending grease drain through forming said surface irregularity and an adjacent counter work surface and wherein said bottom surface of the drive unit includes at least one downwardly extending boss spanning the interior width of the grease trough.

5. An apparatus in accordance with claim 2 wherein said grid more particularly comprises a pair of spaced, longitudinally oriented frame members and a plurality of laterally oriented, spaced rods connecting said frame members, the bottom surface of said frame members forming slides for sliding on the griddle and said rods upwardly offset for said bottom surface and spaced above the griddle and wherein said adjacent surface includes a downwardly and laterally extending grease drain trough forming said surface irregularity and an adjacent counter work surface and wherein said bottom surface of the drive unit includes at least one downwardly extending boss spanning the interior width of the grease trough.

6. An apparatus in accordance with claim 5 wherein said drive unit includes a linearly reciprocating drive shaft extending longitudinally from the drive unit and having a body attached at its distal end with a vertically arranged annular slot forming one of the coupling members and wherein the other coupling member comprises an upstanding panel attached to said grid and having an upwardly opening notch at its top position to seat within said annular slot.

7. An apparatus in accordance with claim 2 wherein said male member comprises a lateral cross bar having oppositely directed fingers extending from shoulders formed at the ends of the cross bar and said female member comprises a pair of upwardly extending struts spaced a distance substantially equal to the distance between said shoulders and each having a slot for receiving a different one of said fingers, said slot opening toward the drive unit and extending upwardly, the opening of said slot being below the level of the fingers when the grid and the drive unit are mounted in their operable position.

8. An apparatus in accordance with claim 1 wherein said grid more particularly comprises a pair of spaced, longitudinally oriented frame members and a plurality of laterally oriented, spaced rods connecting said frame members, the bottom surface of said frame members forming slides for sliding on the griddle and said rods upwardly offset from said bottom surface and spaced above the griddle.

9. An apparatus in accordance with claim 1 wherein said drive unit is also provided with a timer and an alarm signal unit actuated by the timer.

* * * * *